(12) United States Patent  (10) Patent No.: US 7,891,477 B2
Christensen et al.  (45) Date of Patent: Feb. 22, 2011

(54) CLUTCH ASSEMBLY WITH CENTRIFUGAL HEAD PRESSURE CONTROL

(75) Inventors: Thomas F. Christensen, Twin Lakes, WI (US); Richard A. Miller, Racine, WI (US); Benjamin L. McCash, Burr Ridge, IL (US)

(73) Assignee: CNH America LLC, New Holland, PA (US)

( * ) Notice: Subject to any disclaimer, the term of this patent is extended or adjusted under 35 U.S.C. 154(b) by 357 days.

(21) Appl. No.: 11/690,172

(22) Filed: Mar. 23, 2007

(65) Prior Publication Data

US 2008/0093195 A1   Apr. 24, 2008

Related U.S. Application Data

(60) Provisional application No. 60/862,524, filed on Oct. 23, 2006.

(51) Int. Cl.
  *F16D 13/42* (2006.01)
(52) U.S. Cl. .................. 192/85.29; 192/113.35
(58) Field of Classification Search .......... 192/106 F, 192/113.35, 85.29
See application file for complete search history.

(56) References Cited

U.S. PATENT DOCUMENTS

| 2,178,017 | A |   | 10/1939 | Fedden et al. |   |
|---|---|---|---|---|---|
| 2,282,543 | A |   | 5/1942 | Kincaid |   |
| 2,297,480 | A |   | 9/1942 | Kratzman |   |
| 2,864,479 | A | * | 12/1958 | Schindler | 192/85 AA |
| 2,939,558 | A |   | 6/1960 | Schjolin |   |
| 3,576,241 | A | * | 4/1971 | Maurice et al. | 192/85 AA |
| 3,647,037 | A | * | 3/1972 | Toma | 192/106 F |
| 3,833,100 | A | * | 9/1974 | Aschauer | 192/85 R |
| 4,261,455 | A | * | 4/1981 | Uitenbroek et al. | 192/106 F |
| 4,458,797 | A |   | 7/1984 | Hawkins |   |
| 5,551,548 | A | * | 9/1996 | Shubinsky | 192/106 F |
| 5,568,853 | A |   | 10/1996 | Adriaenssens |   |
| 5,890,574 | A |   | 4/1999 | Takahashi |   |
| 6,112,874 | A | * | 9/2000 | Kopp et al. | 192/85 AA |
| 6,206,163 | B1 | * | 3/2001 | Schneider | 192/113.35 |
| 7,104,378 | B2 | * | 9/2006 | Martin | 192/70.19 |

FOREIGN PATENT DOCUMENTS

EP    0329205 A1    1/1989

* cited by examiner

*Primary Examiner*—David D Le
*Assistant Examiner*—Ryan Dodd
(74) *Attorney, Agent, or Firm*—Patrick M. Sheldrake; Michael G. Harms

(57) ABSTRACT

A clutch assembly for an agricultural work vehicle having a piston slidably disposed within a chamber having a first portion and a second portion. The piston is positionable between a first position and a second position in response to a fluid pressure within the first portion of the chamber to actuate a clutch mechanism. A sealing ring is associated with the piston to substantially prevent flow of fluid between the first portion and the second portion when the piston is in the first position. A bleed assembly is configured to permit flow of fluid between the first portion and the second portion when the piston is in the first position. The bleed assembly allows sufficient flow to substantially prevent unintentional engagement of the clutch mechanism.

16 Claims, 11 Drawing Sheets

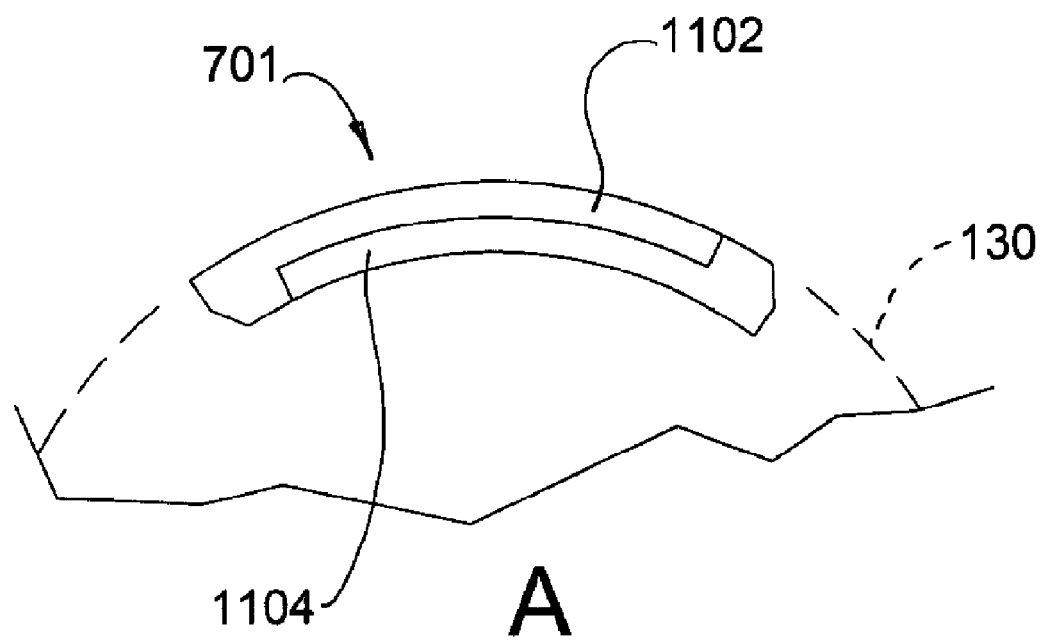
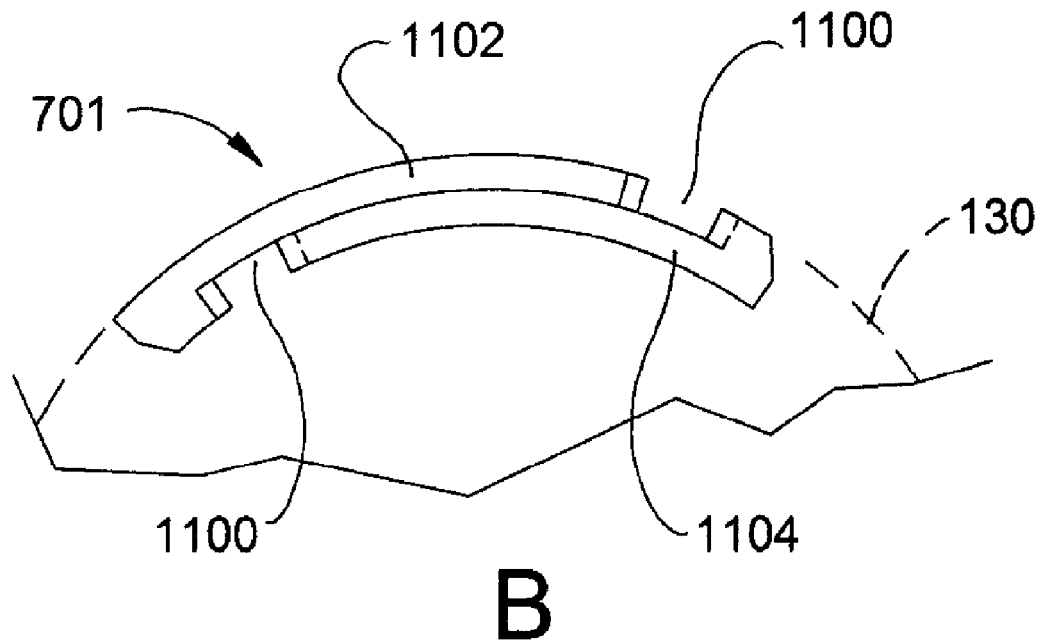
FIG. 11

CLUTCH ASSEMBLY WITH CENTRIFUGAL HEAD PRESSURE CONTROL

FIELD OF THE INVENTION

The present invention relates generally to transmissions for work vehicles. More particularly, it relates to wet clutches for work vehicle transmissions.

BACKGROUND OF THE INVENTION

Work vehicles employ transmissions that are quite different from those in standard passenger cars. In work vehicles, the power to weight ratio is typically much more limited than it is in automobiles. This means that the engines powering work vehicles are usually running at or near capacity much of the time.

As a result, and particularly for ground engaging vehicles such as tractors towing plows, for example, shifting is critical. In work vehicles, shifting must occur rapidly and with very little delay from the time power is disengaged from the drive wheels to the time power is reengaged to the drive wheels. This rapid disengagement and reengagement permits work vehicles to change gears much more rapidly than is possible in standard automobiles.

Work vehicles are also provided with gearboxes having much closer gear ratios. Unlike a typical automobile, which may have four or even five forward speeds, work vehicles typically have 8, 10 or even 20 forward gears. With this many forward gears, work vehicles spend a great deal of time shifting from one gear ratio to another to optimize vehicle speed and engine load. Unlike automotive transmissions, which have a single large master clutch to disengage the drive train, and three or four shifting forks to shift the gears on their shafts, work vehicle transmissions put several small clutches inside the transmission disposed between shafts and gears and between gears themselves.

In power shift transmissions, there are piston assemblies that facilitate actuation of the clutch and engagement of the clutch plates in the clutch stack, which rotate during operation. A plurality of clutch assemblies and their corresponding piston assemblies engage the different gear ratios. The rotation of the clutch assemblies creates a build up of pressure or "centrifugal head" in the clutch assemblies. Springs, such as arrangements of Belleville washers, are utilized to keep the piston assemblies from engaging the clutch assemblies. The force of the spring provides sufficient force on the piston assembly that centrifugal head is substantially prevented from engaging the clutch during normal operation. If the piston assembly unintentionally engages the clutch assembly when it is not supposed to, the clutch assembly will burn up or wear out.

However, there are times when the transmission is operated at higher speeds than designed for, (e.g., accelerating down hill). This higher rotational speed will turn the clutch and piston assemblies at a speed that will generate excessive centrifugal head behind the piston assembly, causing the pistons to engage or partially engage the clutch assembly. The contact within the clutch assembly of the clutch plates during the times of higher rotation (i.e., unintentional engagement of the clutch assembly) may cause a premature transmission failure.

A known clutch assembly design includes a piston with inner diameter and outer diameter seal rings which are located in a bore to prevent pressurized hydraulic oil from escaping to create a pressure build up behind the piston when engaged. The outer diameter bore is typically a single constant diameter and the seal is typically a solid seal with an o-ring underneath to energize the seal outward against the bore. The contact of seal against the bore will seal the piston pressure cavity and not allow any leakage.

To reduce the effects of centrifugal head build-up in the clutches, several methods have been used. The spring force against the piston assembly can be increased to compensate for the higher speeds. This will, however, reduce the clutch capacity when the clutch is engaged. Another method has been to add a relief valve in the piston or clutch assembly, to reduce the pressure in a controlled manner. The introduction of a relief valve suffers from the drawback that the relief valve will add significant additional cost, is subject to potential malfunction, and may not eliminate all the centrifugal head pressure.

What is needed, therefore, is a clutch assembly that reduces centrifugal head and reduces or eliminates forces urging engagement or partial engagement of the non-activated clutch assemblies during times of increased rotational speed of the clutch assembly. These and other advantages are provided by the clutch assembly described herein.

SUMMARY OF THE INVENTION

One aspect of the invention includes a clutch assembly for an agricultural work vehicle having a piston slidably disposed within a chamber having a first portion and a second portion. The piston is positionable between a first position and a second position in response to a fluid pressure within the first portion of the chamber to actuate a clutch mechanism. A sealing ring is associated with the piston to substantially prevent flow of fluid between the first portion and the second portion when the piston is in the first position. A bleed assembly is arranged and disposed to permit flow of fluid between the first portion and the second portion when the piston is in the first position. The bleed assembly allows sufficient fluid flow to substantially prevent unintentional engagement of the clutch mechanism.

Another aspect of the invention includes an agricultural work vehicle having a clutch assembly including a piston slidably disposed within a chamber having a first portion and a second portion. The piston is positionable between a first position and a second position in response to a fluid pressure within the first portion of the chamber to actuate a clutch mechanism. A sealing ring is associated with the piston to substantially prevent flow of fluid between the first portion and the second portion when the piston is in the first position. A bleed assembly is arranged and disposed to permit flow of fluid between the first portion and the second portion when the piston is in the first position. The agricultural work vehicle having reduced clutch wear.

Still another aspect of the invention includes a method for reducing clutch wear. The method includes providing a piston slidably disposed within a chamber having a first portion and a second portion. The piston is positionable between a first position and a second position in response to a fluid pressure within the first portion of the chamber to actuate a clutch mechanism. A sealing ring is associated with the piston to substantially prevent flow of fluid between the first portion and the second portion when the piston is in the first position. A bleed assembly is arranged and disposed to permit flow of fluid between the first portion and the second portion when the piston is in the first position. Sufficient fluid is bled from the first portion to the second position when the piston is in the first position to substantially prevent unintentional engagement of the clutch mechanism.

An advantage of the present invention is that the centrifugal head is dissipated wherein the path of fluid does not substantially affect shift quality or cause excessive leakage at the "off position" or disengaged position and does not allow leakage when the clutch assembly is engaged.

Another advantage includes a system that allows clutch assemblies to utilize a "keep full" wet clutch assembly when the clutch is disengaged to improve shift quality.

Another advantage is that the system reduces or eliminates the centrifugal head problem with clutches.

Still another advantage includes improved clutch life when centrifugal head contributes to pistons engaging the clutch assembly at undesired times.

Still another advantage includes increased clutch capacity wherein a reduced spring force is required to operate the clutch assembly.

Still another advantage includes the use of inexpensive, low complexity components, improving manufacturability and reliability.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIGS. 11A and 11B are partial elevational side views of a bleed ring according to an embodiment of the present invention.

Wherever possible, the same reference numbers are used throughout the drawing to refer to the same or like parts.

DETAILED DESCRIPTION OF THE INVENTION

Figure 1:
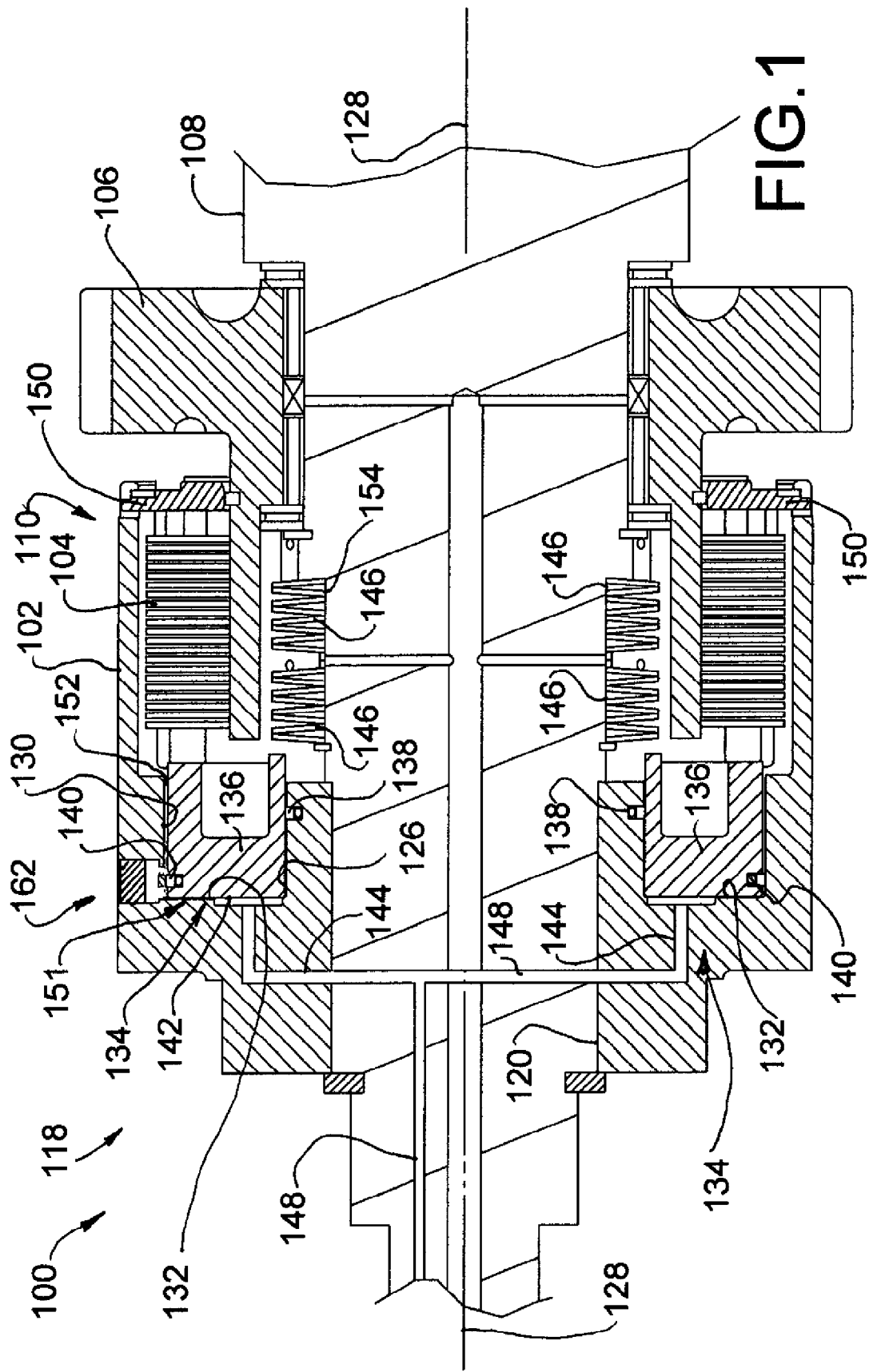
FIG. 1 is an elevational cross-sectional side view of a wet clutch assembly utilizing a bleed assembly according to an embodiment of the present invention.

FIG. 1 illustrates a clutch assembly 100 for an agricultural work vehicle having a clutch carrier 102, clutch plate stack 104 made up of a plurality of interdigitated clutch plates, a gear 106 and a shaft 108 on which the clutch assembly 100 is supported. Gear 106 is supported on shaft 108 for free rotation by an arrangement of bearings. The clutch carrier 102 is an elongated cylindrical body having a thin cylindrical portion 110. The clutch carrier 102 also includes a coupling or shaft mount 118 that is fixed to transmission shaft 108, and is formed integral with and supports thin cylindrical portion 110. Shaft mount 118 includes a central aperture 120 having inwardly facing splines that are dimensioned to receive and engage mating splines on the outer surface of shaft 108. These splines (not shown) ensure that the clutch carrier 102 always rotates with shaft 108.

Shaft mount 118 of clutch carrier 102 includes a hydraulic chamber or cylinder 134 having an inner cylindrical wall 126 that is coaxial with a longitudinal axis 128 and outer cylindrical wall 130 that is also coaxial with the longitudinal axis 128. Walls 126 and 130 are disposed in a parallel relationship and are configured to receive a piston 136. Cylinder 134 also has an end surface 132 that is arranged substantially orthogonal to longitudinal axis 128 of clutch carrier 102 and shaft 108. Walls 126, 130 and end surface 132 define the substantially circular hydraulic cylinder 134 that supports a substantially circular piston 136. Piston 136 is supported in cylinder 134 by two sealing rings 138 and 140. Sealing ring 138 is a substantially circular sealing ring that is disposed in a substantially circular groove in inner wall 126. Sealing ring 140 is disposed in a substantially circular groove in an outer wall of piston 136. These two sealing rings 138, 140 substantially prevent hydraulic fluid that acts on surface 142 of piston 136 from leaking out around the sidewalls of the piston.

Clutch carrier 102 has internal hydraulic fluid passages 144 that extend from end surface 132 to the inner wall of aperture 120. Passages 144 conduct hydraulic fluid to and from a first portion 151 of cylinder 134. The first portion 151 of cylinder 134 includes a variable volume that expands when fluid pressure is sufficient to urge piston 136 in a direction toward clutch plate stack 104 in order to engage the clutch and provide rotation to the clutch carrier 102 and shaft 108. The first portion 151 includes the portion of the cylinder 134 having the volume formed by sealing ring 138 and sealing ring 140 receiving fluid pressure via passage 144. As second portion 152 of cylinder 134 includes the portion of the cylinder 134 on the opposite side of sealing rings 138, 140 as the first portion 151, wherein the second portion 152 may include the portion of the cylinder that is in fluid communication with the clutch components, such as clutch plate stack 104. When hydraulic fluid is introduced into passages 144, it forces piston 136 away from the end surface 132 of circular cylinder 134 (to the right as shown in FIG. 1) toward the clutch plate stack 104, wherein the volume of the first portion 151 is increased and the volume of the second portion 152 is decreased. When hydraulic fluid is removed from passages 144 and from the first portion 151, piston 136 is urged by Belleville washers 146 toward end surface 132 and away from clutch plate stack 104.

In use, hydraulic valves connected to the transmission apply hydraulic fluid under pressure into passages 148 where the fluid is conducted up shaft 108 and into passages 144 in clutch carrier 102. This fluid then forces piston 136 toward the clutch plate stack 104, compressing the clutch plate stack 104 against clutch backing plate 150. It is this compression that forces the clutch plates together and engages the clutch.

Clutch assembly 100 also includes Belleville washers 146. These washers 146 are arranged in an alternating stack with abutting inside edges 154. In this configuration, the stack of washers acts as a spring, pushing against circular piston 136 that tends to force piston 136 in a direction toward end surface 132. The force provided by washers 146 urges piston 136 away from the clutch plate stack 104 giving the clutch plates room to move with respect to each other without binding. Thus, whenever sufficient hydraulic fluid is released from passages 148 the force provided by washers 146 overcomes the fluid pressure in passages 144, urging piston 136 away from clutch plate stack 104, thereby disengaging clutch assembly 100.

When piston 136 applies pressure to the clutch plate stack 104, the piston 136 forces both sets of interleaved plates together causing the plates to rotate together as one. Since the one set of plates of the plate stack 104 is engaged by splines to gear 106, and another set of plates plates of plate stack 104 is engaged by ears or protrusions to clutch carrier 102, and since clutch carrier 102 is fixed to shaft 108, gear 106 rotates with shaft 108 whenever the clutch is engaged. When piston 136 is forced against the clutch plate stack 104, it causes the clutch plate stack 104 to lock together and rotate as one single structure, this also causes gear 106 to rotate together with shaft 108 as though gear 106 was fixed rigidly on shaft 108.

Figure 2:
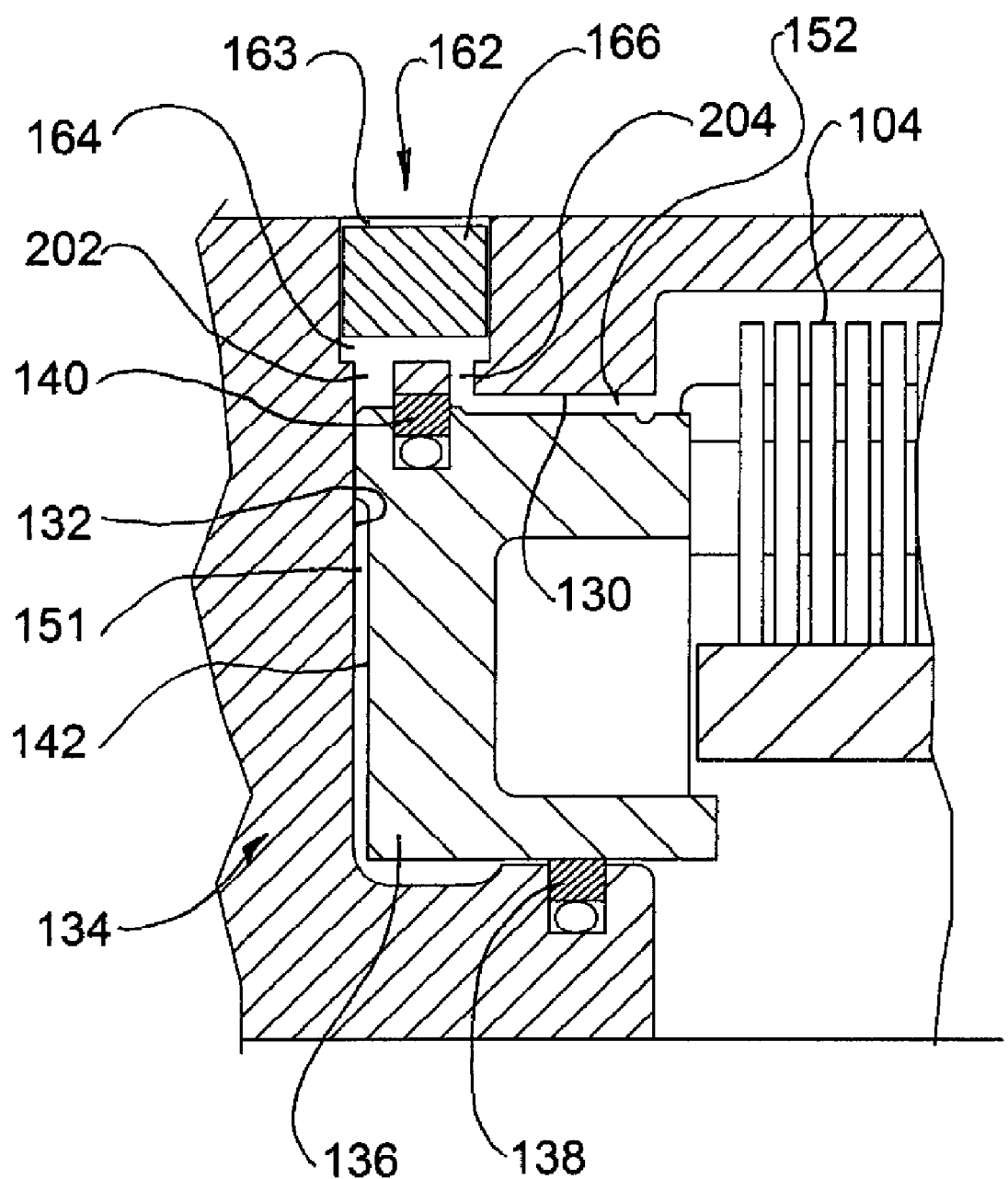
FIG. 2 is an elevational expanded cross-sectional side view of the assembly of FIG. 1 in the disengaged position.

As shown in FIGS. 1 and 2, a bleed assembly 162 is arranged and disposed adjacent the cylinder 134. Although a single bleed assembly 162 is shown, a plurality of bleed assemblies 162 may be arranged along the circumference of the clutch carrier 102. The bleed assembly 162 in this embodiment of the invention includes a bleed chamber 164 through which fluid is permitted to pass when surface 142 of piston 136 is positioned substantially adjacent to the end surface 132. Bleed chamber 164 includes a sealing plug 166 positioned to seal the chamber from fluid leakage out of cylinder 134. The seal plug 166 is any known sealing device suitable for sealing opening 163 from fluid leakage. In an embodiment of the invention, an opening or bore 163 may be machined in the clutch carrier 102. Bleed ports 202 and 204 (not shown in FIG. 1, see e.g., FIGS. 2-6) are then machined in the opening formed to provide fluid communication with the cylinder 134. A sealing plug 166 is thereafter inserted into the opening to form the bleed chamber 164. Although FIGS. 1-5 show the presence of a sealing plug 166, the bleed chamber 164 may be formed using any suitable method for forming a chamber that is capable of fluidly communicating with the cylinder 134. For example, the clutch carrier 102 may be cast or formed with a bleed chamber 164 and bleed ports 202 and 204 and not require opening 163.

FIG. 2 includes an expanded view of the bleed assembly 162 and clutch components, including clutch plate stack 104 and clutch backing plate 150. In the position shown in FIG. 2, the piston 136 is in an unengaged position. Surface 142 of piston 136 is substantially adjacent to end surface 132. The first portion 151 of cylinder 134 includes the volume of the cylinder 134 in front of sealing ring 140 forming a chamber that provide fluid pressure to actuate the piston (i.e., left side of sealing ring 140, as shown in FIG. 2). The second portion 152 of cylinder 134 includes the volume of cylinder 134 behind sealing ring 140 and sealing ring 138 (i.e., right side of sealing ring 140 and sealing ring 138, as shown in FIG. 2). The first portion 151 includes a volume into which pressurized fluid is provided to actuate the piston 136 into an engaged position (see, e.g., FIG. 3). As the non-engaged clutch carrier 102 rotates and fluid pressure within first portion 151 increases due to centrifugal forces, fluid may be urged outward toward outer wall 130, particularly during times of excessive rotation, such as during downhill travel of the vehicle, fluid enters the bleed chamber 164 via inlet port 202 and exhaust to the second portion 152 via exhaust port 204, bypassing the sealing ring 140. Once the fluid pressure has dissipated, washers 146 (FIG. 1) urge the piston 136 toward the end surface 132 contact and the fluid is prevented from bleeding through the bleed assembly 162 by sealing plug 166.

Figure 3:
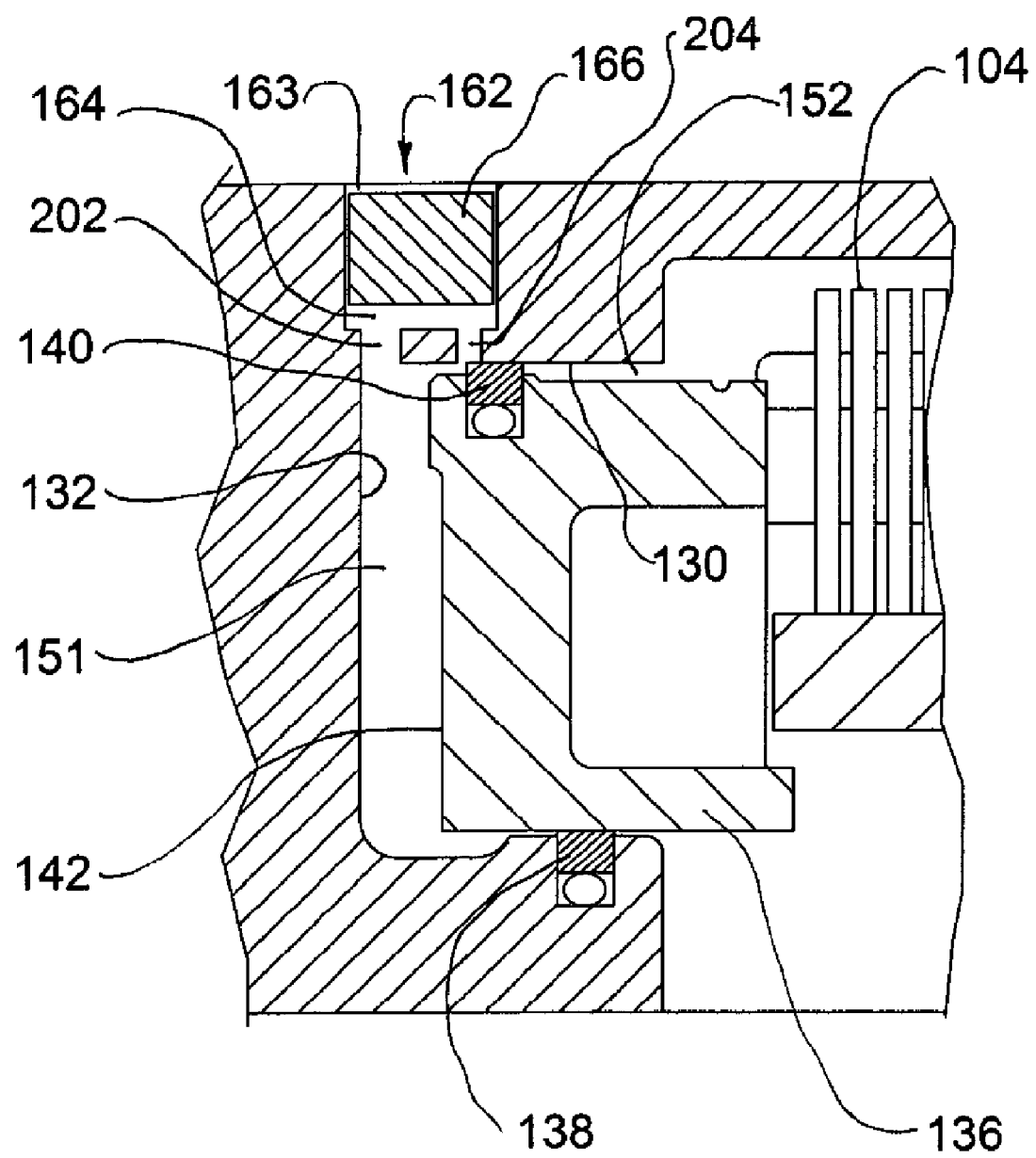
FIG. 3 is an elevational expanded cross-sectional side view of the assembly of FIG. 1 in the engaged position.

FIG. 3 shows the arrangement of FIG. 2, wherein the piston 136 has been urged into the engaged position by fluid pressure in the first portion 151. The fluid pressure provided to the first portion 151 to engage the clutch is a pressure from a clutch valve and is a higher pressure than a pressure present in the first portion 151 at times of excessive rotational speed. The pressure to actuate the piston 136 into the engaged position is sufficient to urge the piston 136 from the position shown in FIG. 2 to a position wherein the sealing ring 140 is in contact with the outer wall 130, wherein a substantially fluid tight seal is present. Therefore, fluid is prevented from bypassing the sealing ring 140 from the first portion 151 to the second portion 152. Fluid entering the bleed chamber 164 from the first portion 151 is permitted only to return to the first portion. That is, any fluid circulating between bleed inlet port 202, bleed exhaust port 204 and bleed chamber 164 remains in first portion 151, the fluid flow ceasing when the pressures between the bleed chamber 164, inlet port 202 and bleed exhaust port 204 equalizes.

Figure 4:
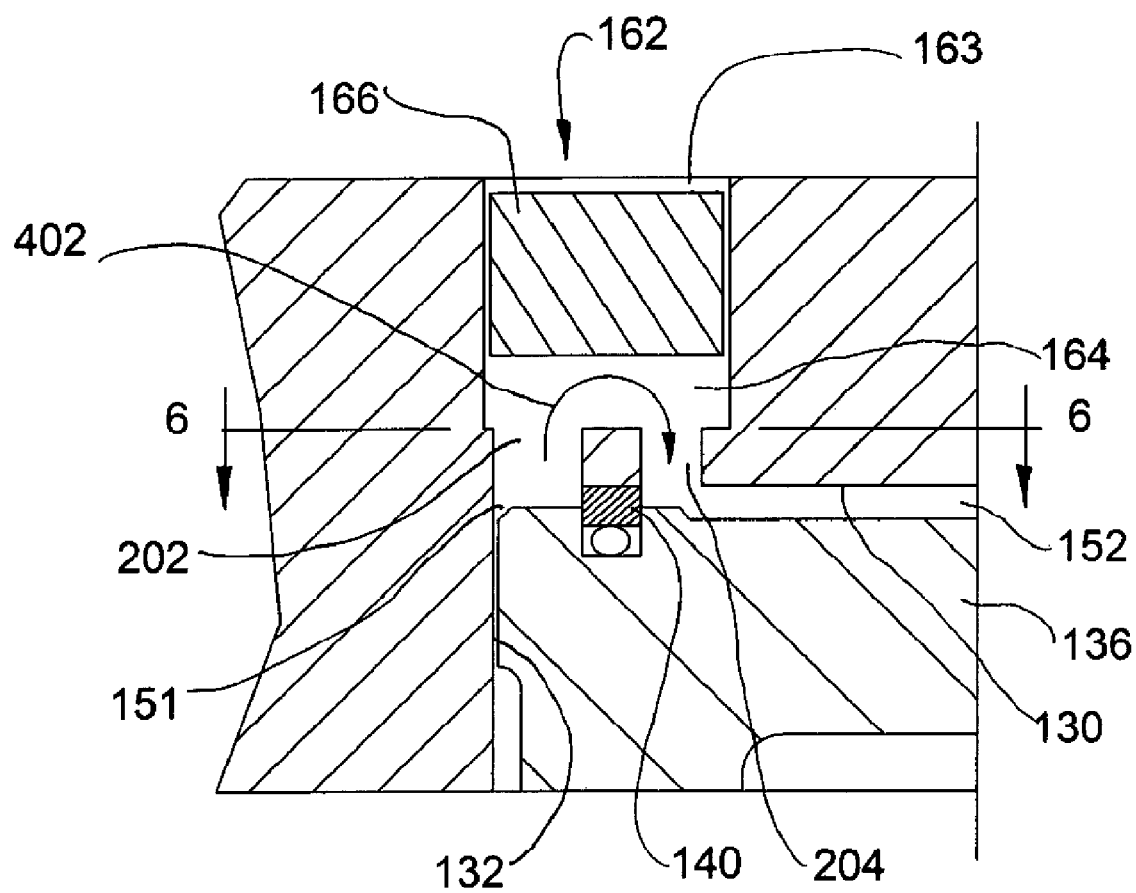
FIG. 4 is an elevational expanded cross-sectional side view of the assembly of FIG. 1 in the disengaged position.

FIG. 4 shows an enlarged view of the bleed assembly 162 with the piston in the disengaged position, wherein the fluid flow 402 of the fluid forming the centrifugal head pressure is shown. During normal operation, the piston 136 is urged against the end surface 132 by a spring, such as Belleville washers 146, or other force-producing device wherein the contact between the piston 136 and end surface 132 is such that the fluid is substantially prevented from escaping through the bleed chamber 164. As the rotational speed of the clutch carrier 102 increases beyond normal operation, such as during downhill acceleration, the centrifugal head in the first portion 151 of cylinder 134 increases sufficiently to urge the piston 136 in a direction toward clutch plate stacks 104. As the piston 136 begins to move, a leak path is opened at the inlet port 202, the pressurized oil flows to the exhaust port 204 and the fluid is exhausted around the piston 136 to reduce the pressure behind the piston 136. The leakage through the bleed assembly 162 prevents the piston 136 from advancing sufficiently toward the clutch stacks 104 to engage the clutch. When the centrifugal head pressure is dissipated, the spring force of the Belleville washers 146 or other spring device will urge the piston toward and against end surface 132. The positioning of the bleed assembly 162 is along the periphery of the cylinder 134, which permit heat pressure to be exhausted at or near a point wherein the pressure, due to centrifugal forces is at or near a maximum value. This positioning allows the bleed assembly according to the present invention to relieve substantially all of the centrifugal head pressure.

Figure 5:
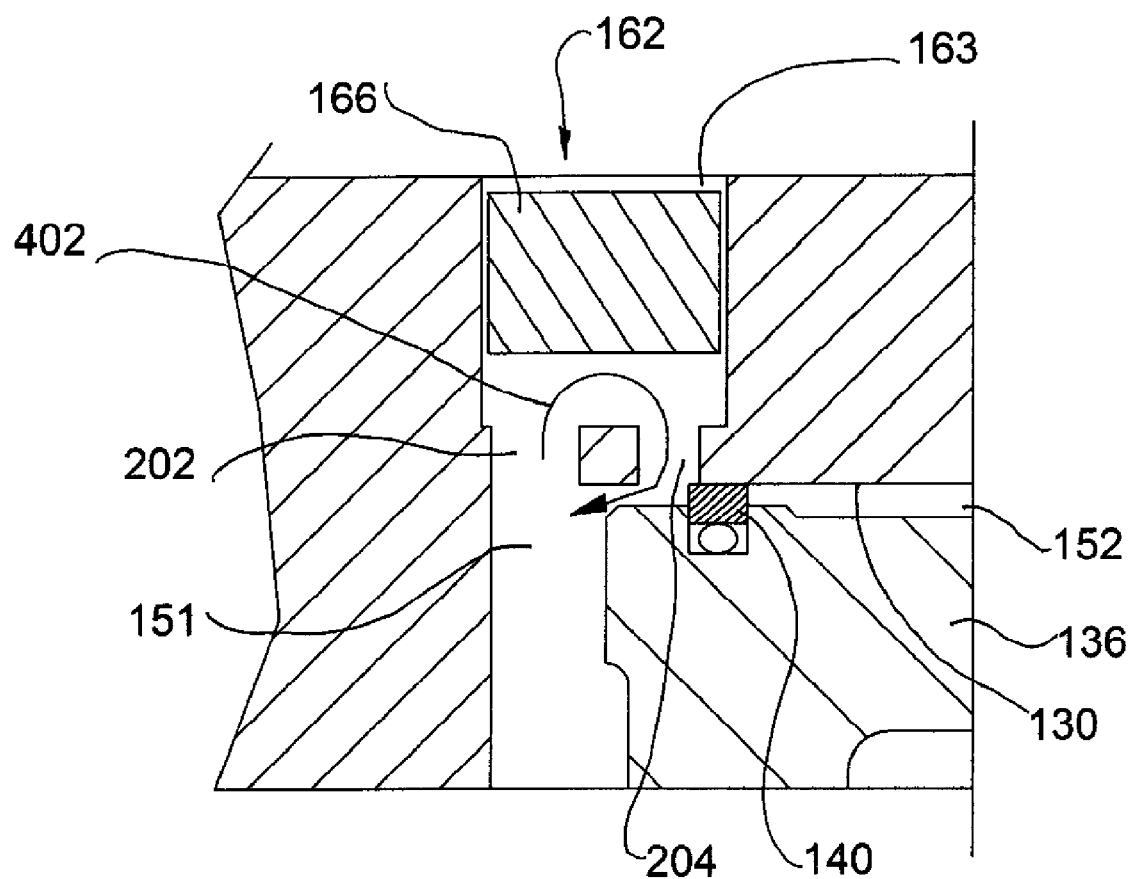
FIG. 5 is an elevational expanded cross-sectional side view of the assembly of FIG. 1 in the disengaged position.

FIG. 5 shows an enlarged view of the bleed assembly 162 having the structure of FIG. 4, wherein the piston 136 is in the engaged position and wherein the fluid flow 402 is shown. In the engaged position, the fluid pressure maintains the piston 136 position and substantially prevents leakage of fluid around sealing ring 138 and sealing ring 140. That is, even if there were any flow of fluid between inlet port 202, exhaust port 204 and bleed chamber 164, the fluid pressure is maintained in first portion 151, and does not reach second portion 152.

Figure 6:
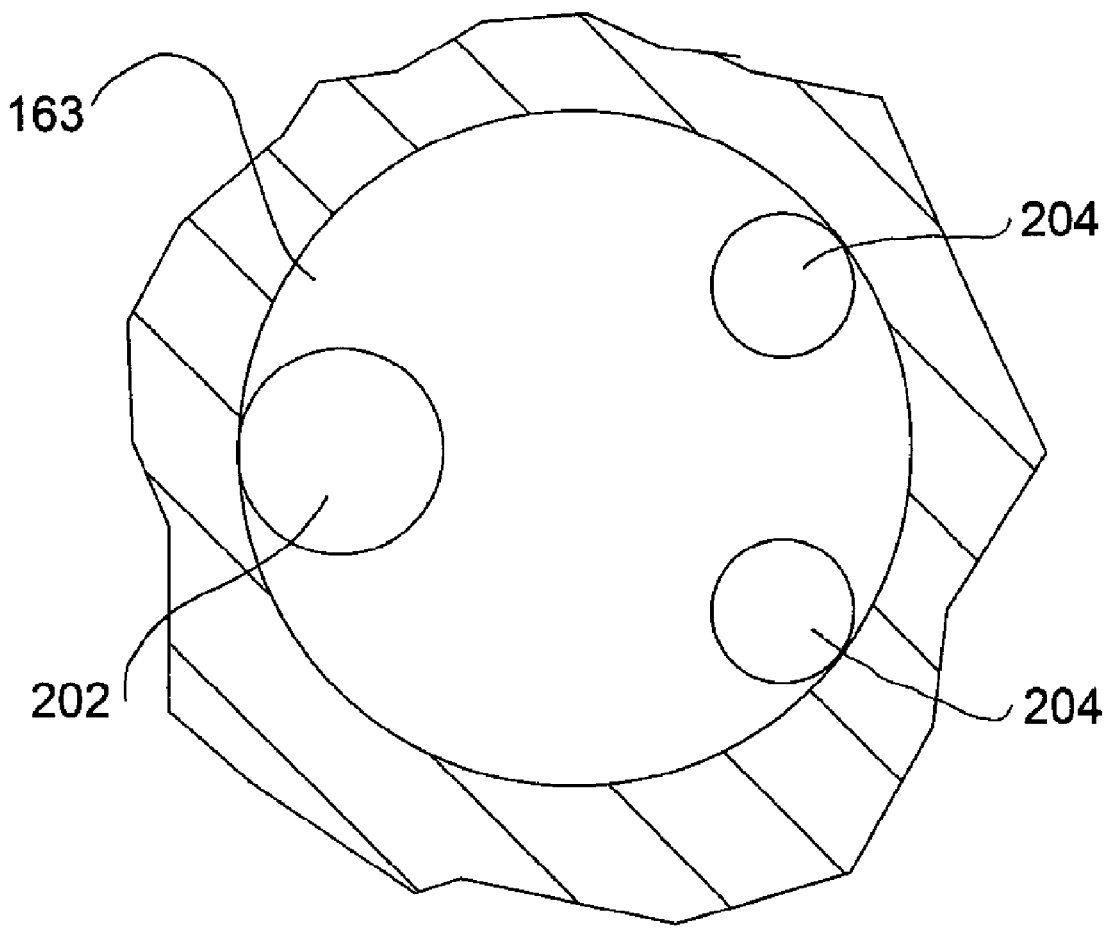
FIG. 6 is a top view showing a portion of the bleed assembly according to an embodiment of the invention viewed along direction 6-6 of FIG. 4.

FIG. 6 shows a view taken along line 6-6 of FIG. 4, wherein a series of ports 202 and 204 at the outer diameter of the clutch carrier 102 are machined. In one embodiment of the invention, an 8.3 mm diameter bore 163 is drilled into the clutch carrier 102. At the bottom of this 8.3 mm diameter bore 163, a 3.0 mm diameter inlet port 202 as the leak path, and then two 1.75 mm diameter exhaust ports 204 are drilled to permit the build-up of fluid pressure behind the piston 136 to escape around the piston-sealing ring 140. A sealing plug 166 (not shown in FIG. 6) is inserted into the 8.3 mm diameter bore 163 to seal off the bleed chamber 164. The ports 202 and 204 are sufficiently small to prevent seal damage, provide fluid pressure that is exhausted from the cylinder 134, and/or leak paths that are reduced or eliminated during actual clutch modulation or activation. While the above has been described with respect to a three-port arrangement, wherein the ports are of exemplary diameters, the present invention is not so limited and may include any configuration of opening that permits bleeding of fluid through the bleed chamber 164.

Figure 7:
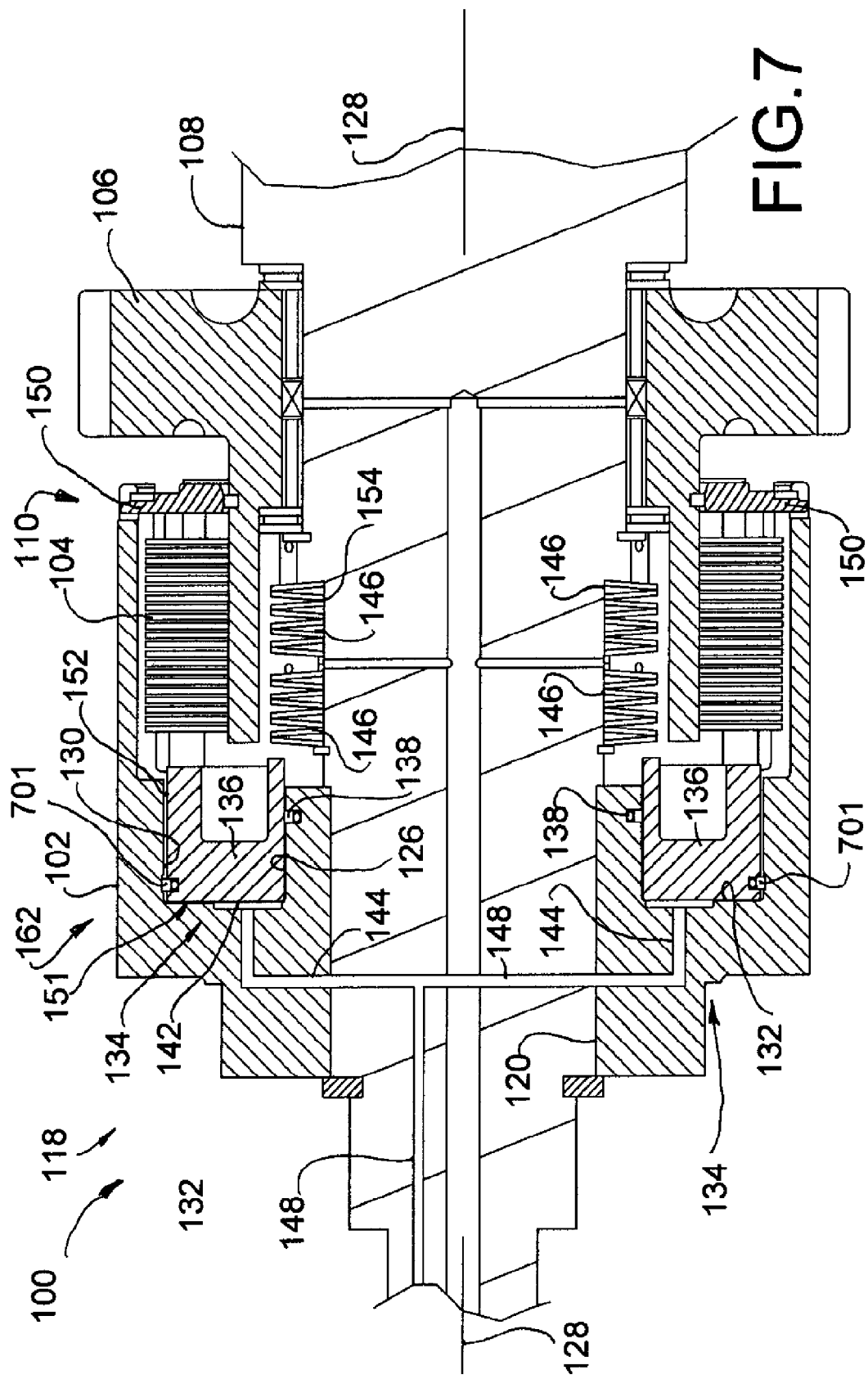
FIG. 7 is an elevational cross-sectional side view of a wet clutch assembly utilizing a bleed assembly according to an embodiment of the present invention.

FIG. 7 illustrates a clutch assembly 100 for an agricultural work vehicle having the clutch structure shown and described with respect to FIG. 1. However, the embodiment shown in FIG. 7 includes a bleed assembly 162 selectively sealing bleed ring 701. Cylinder 134 includes a recess 703 (see, e.g., FIG. 8) configured to contact a surface of bleed ring 701 and permit a sliding contact such that the diameter of the bleed ring 701 is varied between a maximum diameter in the recess 703 to a minimum diameter adjacent to outer wall 130.

Figure 8:
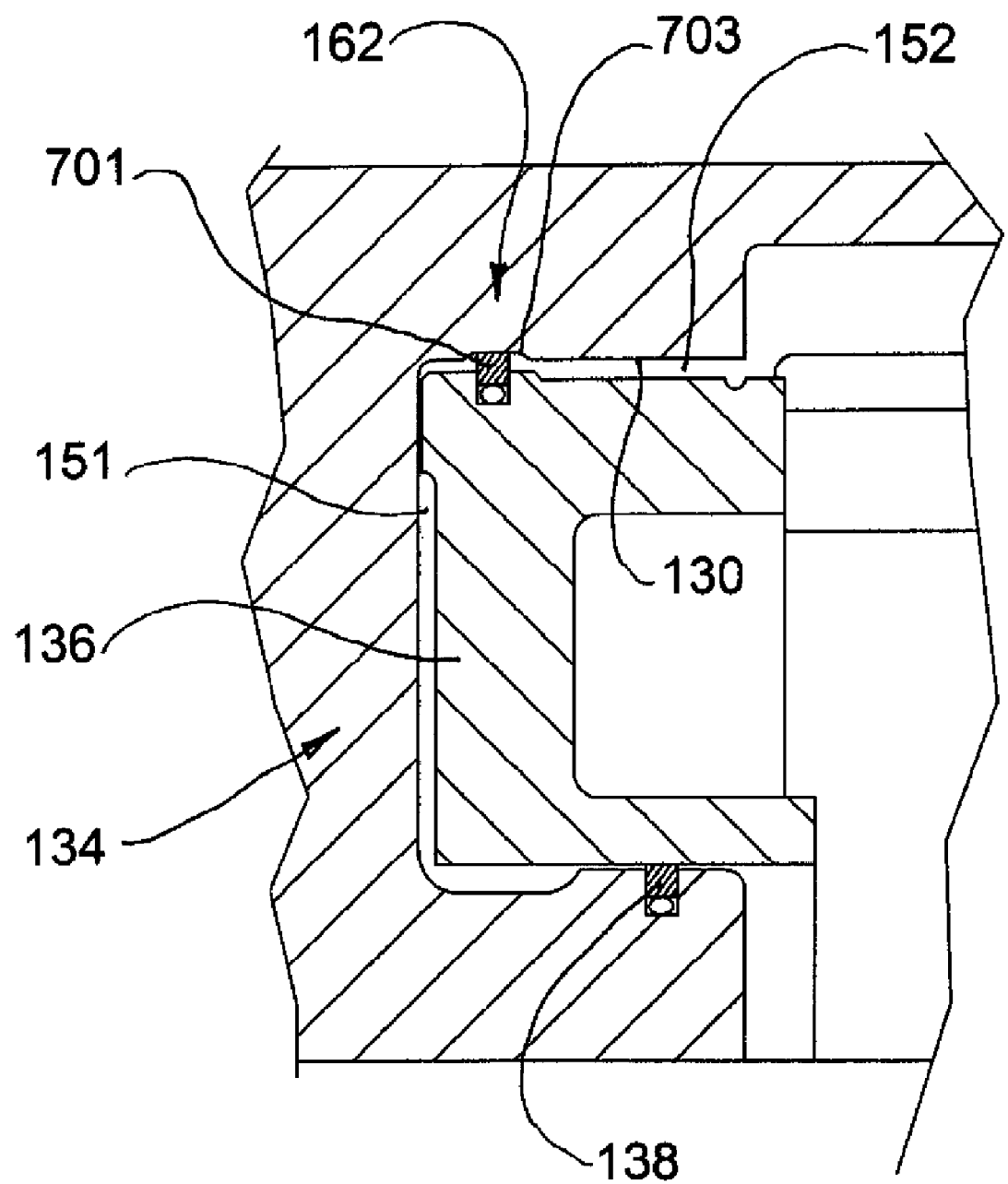
FIG. 8 is an elevational expanded cross-sectional side view of the assembly of FIG. 7 in the disengaged position.

FIG. 8 shows an enlarged view of the bleed assembly 162 with the piston in the disengaged position, wherein the fluid flow 402 of the fluid forming the centrifugal head pressure is shown. As discussed above with respect to FIG. 4, during normal operation, the piston 136 is urged against the end surface 132 by a spring, such as Belleville washers 146, or other force producing device wherein the contact between the piston 136 and end surface 132 is such that the fluid is substantially prevented from escaping through the bleed chamber 164. As the rotational speed of the clutch carrier 102 increases beyond normal operation, such as during downhill acceleration, the centrifugal head in the first portion 151 of cylinder 134 increases sufficiently to urge the piston 136 in a direction toward clutch plate stack 104. As the piston 136 begins to move, a leak path is opened from first portion 151, through bleed ring 701 to second portion 152 around the piston 136 to reduce the pressure behind the piston 136. The leakage through bleed ring 701 prevents the piston 136 from advancing to the clutch plate stack 104 to engage the clutch. When the centrifugal head pressure is dissipated, the spring force of the Belleville washers 146 or other spring device will urge the piston 136 back toward the end surface 132 wherein contact with the end surface 132 substantially prevents fluid from escaping through the bleed chamber 164. The positioning of the bleed assembly 162, specifically the bleed ring 701, is along the periphery of the cylinder 134, which permit heat pressure to be exhausted at or near a point wherein the pressure, due to centrifugal forces, is at or near a maximum value. This positioning allows the bleed assembly 162 according to the present invention to relieve substantially all of the centrifugal head pressure.

Figure 9:
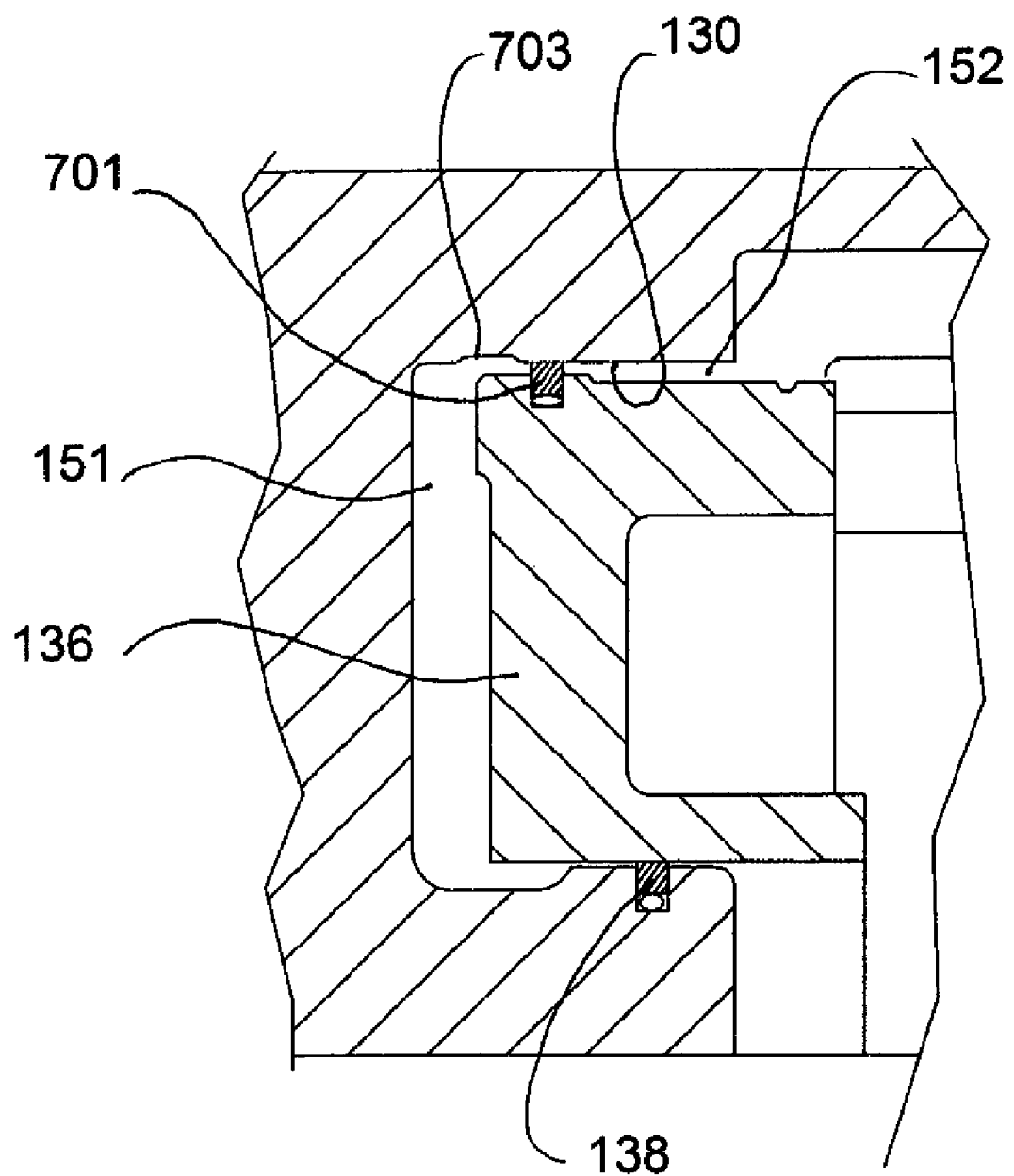
FIG. 9 is an elevational expanded cross-sectional side view of the assembly of FIG. 7 in the engaged position.

FIG. 9 shows an enlarged view of the bleed assembly 162 having the structure of FIG. 8, wherein the piston 136 is in the engaged position and wherein the flow of fluid is substantially prevented. In the engaged position, the fluid pressure in the first portion 151 maintains the piston 136 position and bleed ring 701 has a reduced diameter corresponding to a configuration that substantially prevents leakage of fluid. In other words bleed ring 701 has slid sufficiently along cylinder 134 so that ring 701 is no longer in contact with recess 703 and is in contact with the minimum diameter adjacent to wall 130.

Figure 10:
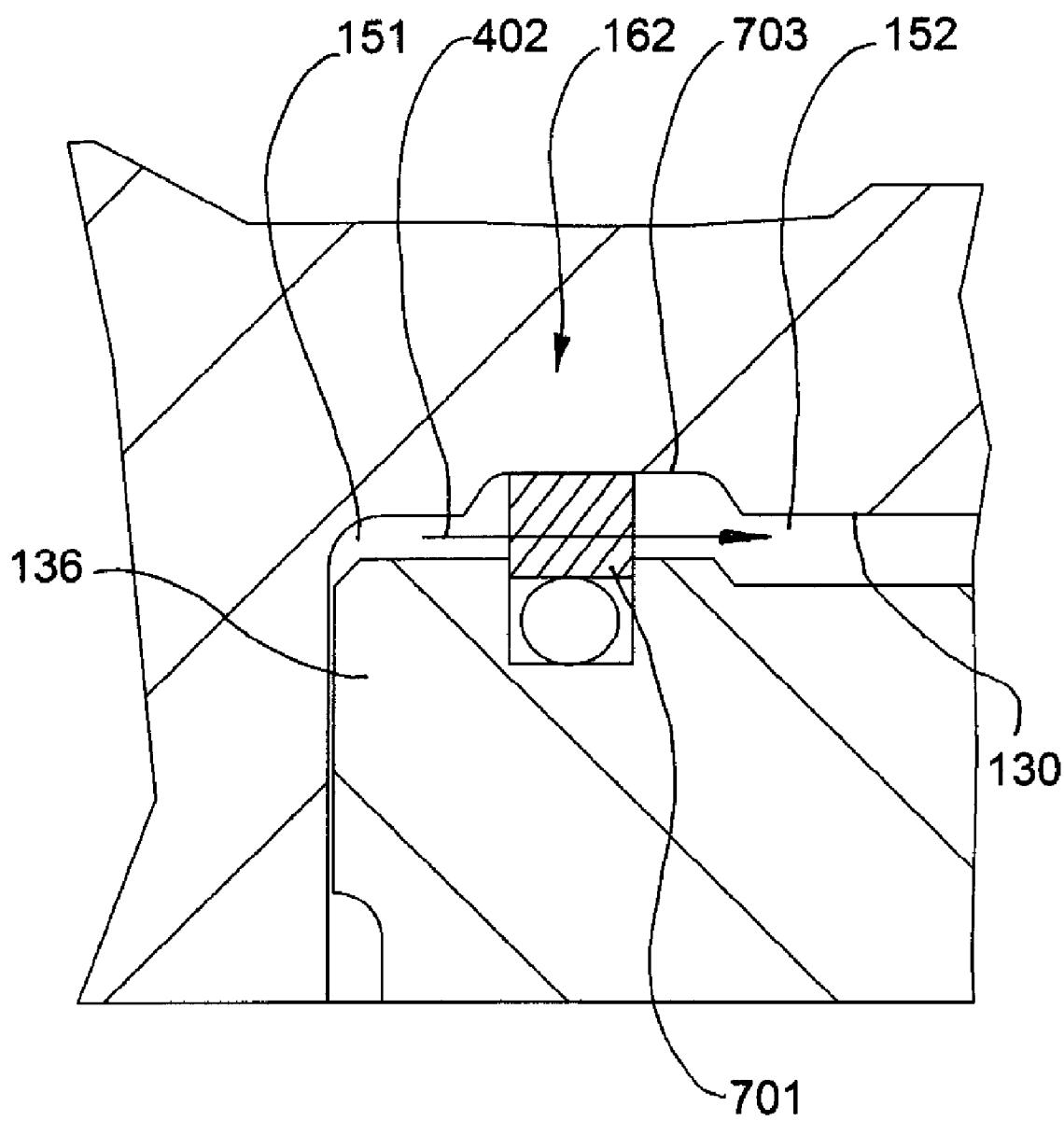
FIG. 10 is an elevational expanded cross-sectional side view of the assembly of FIG. 7 in the disengaged position.

FIG. 10 shows an enlarged view of the bleed assembly 162 with the piston 136 in the disengaged position, wherein the fluid flow 402 of the fluid forming the centrifugal head pressure is shown. The bleed ring 701 conforms to the outer wall 130 and has an increased diameter by virtue of contact with recess 703 corresponding to a position that allows passage of fluid therethrough. Therefore, centrifugal head pressure may be relieved from the first portion 151 to the second portion 152.

FIG. 11A shows bleed ring 701 in sealed position, corresponding to a minimum diameter configuration. FIG. 11B shows bleed ring 701 in a bleed position, corresponding to a maximum diameter configuration. As shown in FIGS. 11A and 11B, the bleed ring 701 may be configured to provide an opening 1100 that closes as the diameter of the bleed ring 701 decreases. That is, as shown in FIGS. 11A and 11B, end portions 1102 and 1104 slidably engage each other. In the smallest diameter configuration (i.e., FIG. 11A), end portions 1102, 1104 are configured to form a substantially fluid tight seal. However, in the maximum diameter condition, end portions 1102, 1104 slide with respect to each other to provide opening 1100, permitting fluid flow therethrough. However, the invention is not limited to the embodiment shown in FIGS. 11A and 11B and may include bleed rings 701 having any structures or geometry that open or close in response to piston 136 position. In particular, the bleed ring 701 may include any sealing structure that provides a closed position when the piston 136 is in the engaged position and permits the flow of fluid when the piston 136 is in the disengaged position.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A clutch assembly for an agricultural work vehicle comprising:
   a piston slidably disposed within a chamber having a first portion and a second portion, the piston being positionable between a first position and a second position in response to a fluid pressure within the first portion of the chamber to actuate a clutch mechanism;
   a sealing ring being associated with the piston for movement therewith, to substantially prevent a flow of fluid between the first portion and the second portion when the piston is in the second position;
   a bleed assembly is arranged and disposed to permit the flow of fluid between the first portion and the second portion when the piston is in the first position, the bleed assembly configured to permit flow by directing the flow of fluid past the sealing ring through a passage between an outward peripheral surface of the piston and the chamber; and
   wherein the bleed assembly is configured into the sealing ring, the sealing ring having a variable diameter wherein flow of fluid is permitted at a first diameter and flow of fluid is substantially prevented at a second diameter and the chamber being configured to receive the sealing ring at varying diameters in response to piston position.

2. The assembly of claim 1, wherein the bleed assembly is configured into the sealing ring, the sealing ring having a variable diameter wherein flow of fluid is permitted at a first diameter and flow of fluid is substantially prevented at a second diameter and the chamber being configured to receive the sealing ring at varying diameters in response to piston position.

3. The assembly of claim 1, comprising a plurality of bleed assemblies.

4. A clutch assembly for an agricultural work vehicle comprising:
- a piston slidably disposed within a chamber having a first portion and a second portion, the piston being positionable between a first position and a second position in response to a fluid pressure within the first portion of the chamber to actuate a clutch mechanism;
- a sealing ring being associated with the piston to substantially prevent a flow of fluid between the first portion and the second portion when the piston is in the second position;
- a bleed assembly is arranged and disposed to permit the flow of fluid between the first portion and the second portion when the piston is in the first position, the bleed assembly configured to permit flow by directing the flow of fluid past the sealing ring through a passage between an outward peripheral surface of the piston and the chamber;
- the bleed assembly including a bleed chamber arranged and disposed adjacent a wall of the chamber and configured to allow sufficient flow to substantially prevent unintentional engagement of the clutch mechanism; and
- wherein the bleed chamber comprises at least two openings through the wall of the chamber positioned on opposing sides of the sealing ring in fluid communication with the first portion and the second portion such that the occurring flow may bypass the sealing ring when the piston is in the first position and such that the second portion is not in fluid communication with the first portion when the piston is in the second position.

5. The assembly of claim 4, wherein the openings comprise three openings.

6. The assembly of claim 4, wherein the bleed chamber and the at least two openings are formed into the clutch assembly.

7. A clutch assembly for an agricultural work vehicle comprising:
- a piston slidably disposed within a chamber having a first portion and a second portion, the piston being positionable between a first position and a second position in response to a fluid pressure within the first portion of the chamber to actuate a clutch mechanism;
- a sealing ring being associated with the piston to substantially prevent a flow of fluid between the first portion and the second portion when the piston is in the second position;
- a bleed assembly is arranged and disposed to permit the flow of fluid between the first portion and the second portion when the piston is in the first position; and
- the bleed assembly including a bleed chamber arranged and disposed adjacent a wall of the chamber and at least two openings positioned in fluid communication with the first portion and the second portion when the piston is in the first position and in fluid communication with the first portion when the piston is in the second position, wherein the bleed assembly allows sufficient flow to substantially prevent unintentional engagement of the clutch mechanism, and
- the bleed chamber including a machined bore through a portion of the clutch assembly wherein the at least two openings are formed in the bore and the bore is sealed with a sealing plug.

8. An agricultural work vehicle comprising
a clutch assembly including a piston slidably disposed within a chamber having a first portion and a second portion, the piston being positionable between a first position and a second position in response to a fluid pressure within the first portion of the chamber to actuate a clutch mechanism;
- a sealing ring being associated with the piston for movement therewith to substantially prevent a flow of fluid between the first portion and the second portion when the piston is in the second position;
- a bleed assembly is arranged and disposed to permit the flow of fluid between the first portion and the second portion when the piston is in the first position, the bleed assembly configured to permit flow by directing the flow of fluid past the sealing ring through a passage between an outward peripheral surface of the piston and the chamber, wherein the bleed assembly includes a bleed chamber arranged and disposed adjacent a wall of the chamber, and wherein the bleed chamber comprises at least two openings through the wall of the chamber positioned on opposing sides of the sealing ring in fluid communication with the first portion and the second portion such that the occurring flow may bypass the sealing ring when the piston is in the first position and such that the second portion is not in fluid communication with the first portion when the piston is in the second position.

9. The work vehicle of claim 8, wherein the bleed chamber is formed by machining a bore through a portion of the clutch assembly wherein the at least two openings are formed in the bore and the bore is sealed with a sealing plug.

10. The work vehicle of claim 8, wherein the openings comprise three openings.

11. The work vehicle of claim 8, wherein the bleed chamber and the at least two openings are formed into the clutch assembly.

12. The work vehicle of claim 8, comprising a plurality of bleed assemblies.

13. A method for reducing clutch wear comprising:
providing a clutch assembly having a piston slidably disposed within a chamber having a first portion and a second portion, the piston being positionable between a first position and a second position in response to a fluid pressure within the first portion of the chamber to actuate a clutch mechanism, a sealing ring being associated with the piston for movement therewith, to substantially prevent a flow of fluid between the first portion and the second portion when the piston is in the second position, and a bleed assembly is arranged and disposed to permit the flow of fluid between the first portion and the second portion when the piston is in the first position, the bleed assembly configured to permit flow by directing the flow of fluid past the sealing ring through a passage between an outward peripheral surface of the piston and the chamber; the passage including at least two openings through a wall of the chamber; and
bleeding sufficient fluid from the first portion to the second portion when the piston is in the first position to substantially prevent unintentional engagement of the clutch mechanism.

14. The method of claim 13, wherein the providing step includes machining a bore into a portion of the clutch assembly and the at least two openings are machined, wherein the at least two openings are positioned on opposing sides of the sealing ring in fluid communication with the first portion and the second portion for bypassing the sealing ring by directing fluid from a first side of the sealing ring to a second side of the sealing ring when the piston is in the first position and such that the second portion is not in fluid communication with the first portion when the piston is in the second position; and sealing the bore.

15. The method of claim 14, wherein the bore is sealed with a sealing plug.

16. A method for reducing clutch wear comprising:
providing a clutch assembly having a piston slidably disposed within a chamber having a first portion and a second portion, the piston being positionable between a first position and a second position in response to a fluid pressure within the first portion of the chamber to actuate a clutch mechanism, a sealing ring being associated with the piston for movement therewith, to substantially prevent a flow of fluid between the first portion and the second portion when the piston is in the second position, and a bleed assembly is arranged and disposed to permit the flow of fluid between the first portion and the second portion when the piston is in the first position, the bleed assembly configured to permit flow by directing the flow of fluid past the sealing ring through a passage between an outward peripheral surface of the piston and the chamber;

bleeding sufficient fluid from the first portion to the second portion when the piston is in the first position to substantially prevent unintentional engagement of the clutch mechanism; and wherein the providing step includes forming the bleed assembly by forming a sealing ring, the sealing ring having a variable diameter wherein flow of fluid is permitted at a first diameter and flow of fluid is substantially prevented at a second diameter; and wherein the chamber is configured to contact and vary the diameter of the seal ring in response to the position of the piston.

* * * * *